(12) United States Patent
McConnell et al.

(10) Patent No.: US 6,940,867 B1
(45) Date of Patent: Sep. 6, 2005

(54) SYSTEM AND METHOD FOR TRANSMISSION OF DIGITIZED AUDIO SAMPLES

(75) Inventors: William D. McConnell, Garland, TX (US); Mark E. Smith, Garland, TX (US)

(73) Assignee: Uniden America Corporation, Fort Worth, TX (US)

( * ) Notice: Subject to any disclaimer, the term of this patent is extended or adjusted under 35 U.S.C. 154(b) by 939 days.

(21) Appl. No.: 09/705,558

(22) Filed: Nov. 2, 2000

(51) Int. Cl.$^7$ ................................................ H04J 3/16
(52) U.S. Cl. ................. 370/465; 370/470; 370/472; 370/477; 370/545
(58) Field of Search ........................ 370/470, 472, 370/476, 477, 362, 465, 545

(56) References Cited

U.S. PATENT DOCUMENTS

| | | | |
|---|---|---|---|
| RE29,215 E * | 5/1977 | Carney et al. | 370/538 |
| 5,461,618 A * | 10/1995 | Chen et al. | 370/470 |
| 5,896,374 A * | 4/1999 | Okumura et al. | 370/311 |
| 6,285,682 B1 * | 9/2001 | Proctor et al. | 370/465 |
| 6,744,744 B1 * | 6/2004 | Tong et al. | 370/320 |

* cited by examiner

*Primary Examiner*—Ricky Ngo
*Assistant Examiner*—Nittaya Juntima
(74) *Attorney, Agent, or Firm*—Baker Botts L.L.P.

(57) ABSTRACT

A system for transmitting data includes a receiver that receives data at a first data transfer rate. A processor buffers the data into sequential frames of a predetermined length of time and arranges the frames into a byte of data. A transmitter transmits the byte of data a number of times greater than one and equal to a second data transfer rate divided by the first data transfer rate.

23 Claims, 5 Drawing Sheets

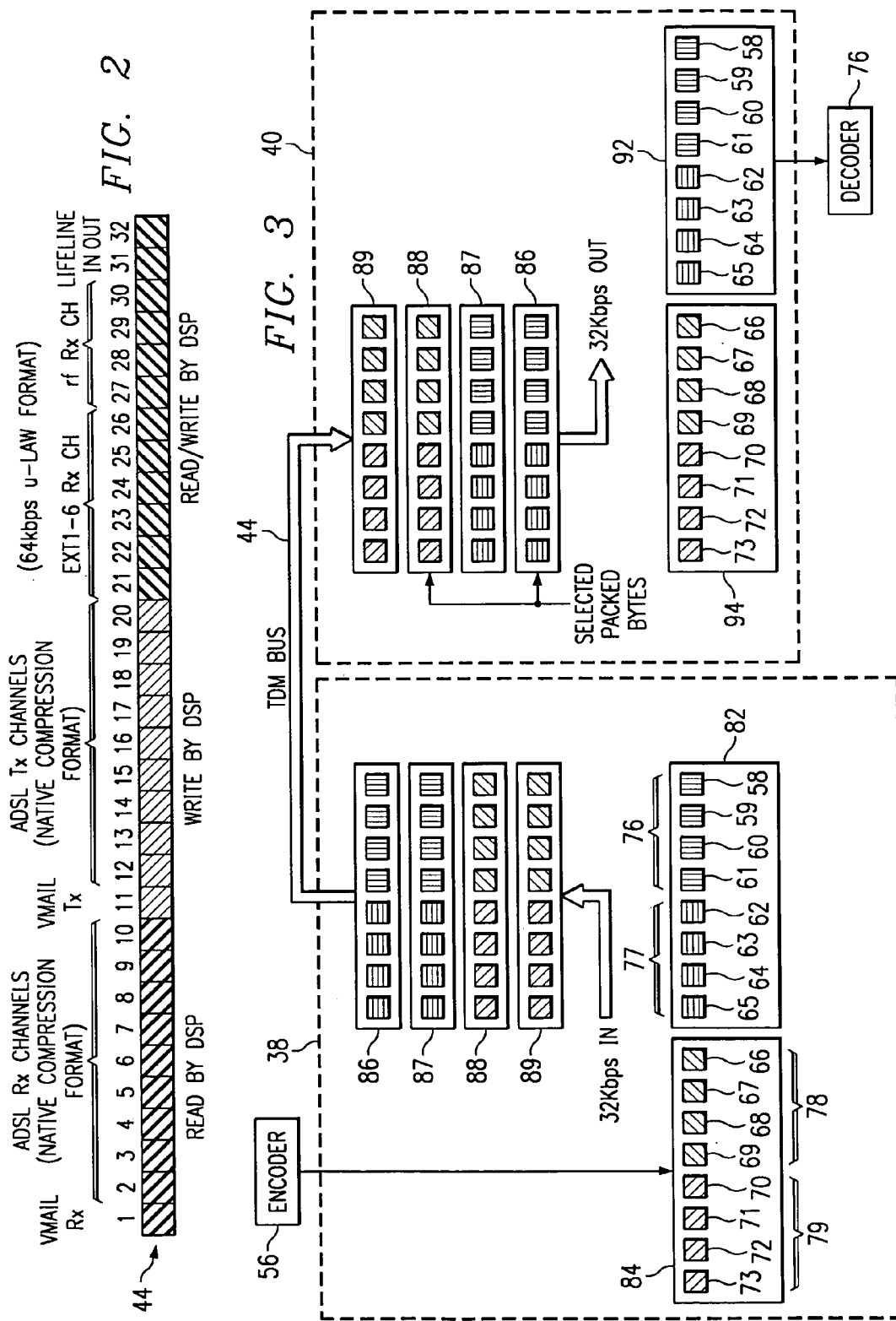

SYSTEM AND METHOD FOR TRANSMISSION OF DIGITIZED AUDIO SAMPLES

TECHNICAL FIELD OF THE INVENTION

The present invention relates generally to network communications and, more particularly to a system and method for transmission of digitized audio samples.

BACKGROUND OF THE INVENTION

Data transfer between network elements is typically accomplished using synchronous or asynchronous transmission techniques. Various protocols and standards of the communications industry define the transmission type, speed, and various characteristics associated with data transfer. In many instances, systems and equipment operating pursuant to different protocols and standards are incorporated into a single network. For example, a network element configured for asynchronous transmission may share a network with a network element configured for synchronous transmission. Therefore, asynchronous to synchronous converters have been established to convert asynchronous data streams to synchronous data streams, and vice versa.

Such converters typically employ elaborate and complex framing mechanisms to define boundaries of the asynchronous characters being transported. Expensive and powerful computer equipment is required of such systems to verify frame synchronization and frame alignment. Exemplary rate adaptation techniques include high level data link control (HDLC) and terminal rate adaptation protocols such as V.110 and V.120.

It is not unusual for a stream of data to be converted several times on route from its origin to its destination. For example, an asynchronous data stream may be converted to a synchronous data stream, and back to an asynchronous data stream before reaching its destination.

As a further complication, systems using the same data transmission techniques (e.g., synchronous or asynchronous) often operate at different speeds. Therefore, converters must be configured to receive and/or send synchronous or asynchronous data streams at different rates of transmission. However, the hardware and software necessary to perform such conversions are elaborate, cumbersome and in many instances, cost prohibitive.

SUMMARY OF THE INVENTION

The present invention provides a system and method for transmission of digitized audio samples that substantially eliminate or reduce the problems and disadvantages associated with the previous methods and systems. In particular embodiments, asynchronous data packets are converted into a stream of synchronous voice samples in a manner that minimizes the processing necessary to convert the synchronous voice samples back into asynchronous data packets at a destination central processing unit. An asynchronous to synchronous to asynchronous conversion path is provided wherein a bi-directional, time division multiplexed (TDM) bus provides a synchronous highway between two asynchronous ends.

In accordance with a particular embodiment of the present invention, a system for data transmission comprises a receiver operable to receive data at a first data transfer rate. A central processing unit operable to buffer the data into a plurality of sequential frames of a predetermined length of time and to arrange the frames into a byte of data, is coupled with the receiver. A transmitter is also provided which is operable to transmit the byte of data an integer number of times greater than one and equal to a second data transfer rate divided by the first data transfer rate.

In accordance with another aspect of the present invention, a system is provided having a receiver operable to receive bytes of data at a first data transfer rate. The system may also include a central processing unit operable to buffer the bytes of data into a plurality of samples and subsample one of a subset of the plurality of samples, wherein the subset of the plurality of samples includes a number of samples greater than one and equal to a second data transfer rate divided by the first data transfer rate. In accordance with yet another aspect of the present invention, the central processing unit may include a digital signal processor.

Technical advantages of certain embodiments of the present invention include a system and method for transmission of digitized audio samples which converts asynchronous data packets to a synchronous stream of voice samples. The conversion is accomplished in a manner which minimizes processing power necessary to convert the synchronous stream of voice samples back into asynchronous data packets at a destination central processing unit.

Another technical advantage of certain embodiments of the present invention includes a synchronous, time division multiplexed bus which forms a synchronous highway between two asynchronous terminal units. The synchronous bus is bi-directional and transfers data between two terminal units. The synchronous bus is also configured to transfer synchronous voice samples originally received at one of the terminal units at one of various asynchronous data transmission rates.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 2 is a block diagram illustrating the communication bus of FIG. 1, in accordance with a particular embodiment of the present invention;

FIG. 3 is a block diagram illustrating a method for transmitting thirty-two kilobit per second data through the communication system of FIG. 1, in accordance with a particular embodiment of the present invention;

DETAILED DESCRIPTION OF THE INVENTION

Figure 1:
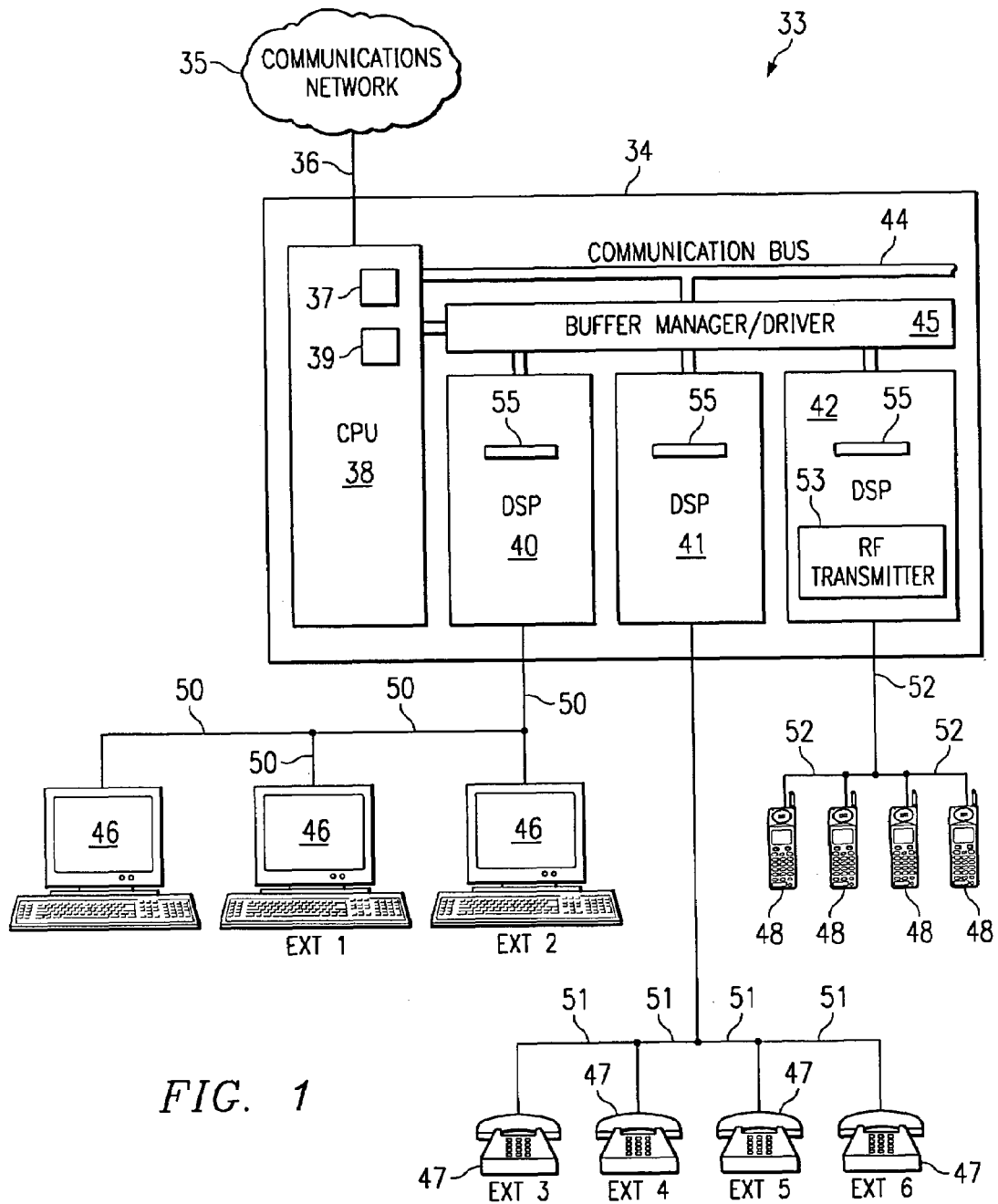
FIG. 1 is a block diagram illustrating a communication system incorporating aspects of the present invention, which couples a communication network with one or more terminal units.

FIG. 1 illustrates a communication network 33 that includes a communication system 34 coupled with a communications network 35, through a communication link 36. Voice, video data, control and/or other signals (hereinafter, collectively "data") are distributed between communications network 35 and communication system 34. Signals received by communication system 34 are processed at a central processing unit 38, and distributed to one or more of a plurality of processors 40–42, using a communication bus 44. A buffer manager/driver 45 forms an interface between communication bus 44 and processors 40–42. Each processor 40–42 includes an associated high speed, multi-channel, buffered serial port (McBsp port) 55. In the illustrated embodiment of the present invention, processors 40–42 are digital signal processors (DSPs) configured to transmit and/or receive data to and from a plurality of terminal units 46–48.

Terminal units 46 are desktop personal computers (PCs), laptops, PDAs, or other devices coupled with one another and processor 40 of communication system 34, through communication links 50. Each terminal unit 46 is Internet-enabled and includes a web browser for accessing the World Wide Web (WWW) through telecommunications network 35. Terminal units 46 also include the ability to communicate with one another, and other terminal units 47 and 48 coupled with communication system 34.

Terminal units 47 are telephone extensions coupled with processor 41 of communication system 34 through communication links 51. In particular embodiments, terminal extensions 47 may include various analog, digital, or other wireline voice communication device. Terminal units 47 accommodate wireline telephone communications with each other, network 35, and other terminal units 46 and 48 coupled with communication system 34. Terminal units 47 are also configured to receive control information from communication system 34, and operate subject to the intelligence of communication system 34.

Terminal units 48 are wireless handsets coupled with processor 42 of communication system 34, through wireless communication links 52. Accordingly, processor 42 includes an associated radio frequency (RF) transmitter 53 for the transfer of data between processor 42 and terminal units 48. Data may be sent and received by and among each of terminal units 48, communication system 34, network 35, and other terminal units 46 and 47 coupled with communication system 34. Although FIG. 1 illustrates terminals 46–48, system 33 contemplates any arrangement or number of computing and/or communication devices coupled with communication system 34 using wireless and/or wireline techniques.

Communication system 34 accommodates the transfer of data between network 35 and terminal units 46–48. In the illustrated embodiment, communication link 36 is an asymmetric digital subscriber line (ADSL), a high speed data transmission technology that uses unshielded twisted pair (UTP) copper wires from the central office of a telephone company to the subscribers premises. In another embodiment, communication link 36 may include any high speed communication link including, without limitation, copper, optical or wireless limbs. ADSL 36 transfers data from communication system 34 to network 35 and from network 35 to communication system 34. In general, the rate at which data is received at communication system 34 is greater than the rate at which data is sent from communication system 34, which accounts for the term "asymmetric" digital subscriber line.

In the illustrated embodiment, communications network 35 incorporates both asynchronous and synchronous transmission equipment and technologies. In this manner, network 35 may communicate with a number of different telecommunication networks and products using various data transfer rates, standards and protocols of the telecommunications industry. Therefore, communications network 35 receives, processes, and/or transmits analog and/or digital signals. Accordingly, communication link 36 and communication system 34 are configured to receive data at different rates of transfer. Data packets received at communication system 34 through communication link 36 are asynchronous data packets, and the rate at which the packets are received and transferred to CPU 38 varies according to the specifications of the system sending the data.

Communication bus 44 distributes data and information between CPU 38 and/or processors 40–42. In the illustrated embodiment, communication bus 44 is a bi-directional, multi-rate communication bus. In other words, communication bus 44 is configured to perform two-way communication between components of communication system 34. CPU 38 transfers data to processor 42, for example, and processor 42 transfers data to CPU 38. In a particular embodiment, communication bus 44 may handle two-way communication simultaneously.

Communication bus 44 is time-division multiplexed. Therefore, bus 44 accommodates synchronous data transfer between CPU 38 and processors 40–42. Therefore, asynchronous data packets received at CPU 38 must be converted to synchronous data packets for transfer over communication bus 44. However, terminal units 46–48 are configured to receive standard asynchronous data transfer. Hence, the synchronous data packets transmitted using communication bus 44 are converted back to asynchronous data packets at one or more of processors 40–42, for transfer to one or more of terminal units 46–48. The teachings of the present invention provide a system and method for converting asynchronous data packets to synchronous data packets, in a manner that minimizes the amount of computer processing required to convert the synchronous data packets back to asynchronous data packets, for transmission to terminal units 46, 47 and/or 48.

FIG. 2 illustrates the data format of communication bus 44 in more detail. Bus 44 includes thirty-two channels, labeled 1–32. Each channel 1–32 includes a sixty-four kilobit per second (Kbps) time slot, for a total of 2.048 megabits per second (Mbps), which is common to the telecom industry. In the illustrated embodiment, channels 2–10 are designated ADSL receive channels. In other words, channels 2–10 are designated to be read by one or more processors 40–42. Each channel 2–10 carries digitized audio data transmitted by CPU 38. The receiving processor, for example processor 40, reads, de-interleaves and buffers the data into ten millisecond buffers. This process will be described in more detail with regard to FIGS. 5 and 6.

Channels 12–20 are designated ADSL transmit channels. Accordingly, channels 12–20 are used by processors 40–42 to write information to communication bus 44. Channels 1 and 10 are reserved as voicemail receive and transmit channels, respectively, for use by processors 40–42.

Channels 21–26 are designated receive channels, one for each of six terminal units 46–47. Channels 27–30 are designated radio frequency (RF) receive channels, one for each of four terminal units 48. Channels 31 and 32 are reserved for a "life-line." The life line extension maintains an available communication connection with the plain old telephone system (POTS) network, in case a system failure renders communication system 34 unavailable for ADSL communication. Since channels 21–32 are reserved for communications "internal" to communication system 34, channels 21–32 are both read and write enabled.

CPU 38 is configured to receive digitized voice samples of varying rates, from telecommunications network 35. The voice samples received from telecommunications network 35 include asynchronous data packets. In the illustrated embodiment, the asynchronous data packets are asynchronous transfer mode (ATM) cells. More specifically, the ATM cells may be ATM Adaptation Layer 2 (AAL2) cells. In order to transfer data from the ATM cells over communications bus 44, the ATM cells are converted to a synchronous stream of voice samples. The ATM cells received over communication link 36 are converted into channels of sixty-four Kbps data each, over communication bus 44. Accordingly, data is transferred over communication bus 44 and received at one or more of processors 40–42. The synchronous stream of voice samples is converted back to asynchronous data packets at processors 40–42, for distribution to one or more terminal units 46–48.

Communication bus 44 transmits data at a constant rate of sixty-four Kbps per channel. However, data is received at CPU 38 through communication link 36 at various data transfer rates. System 33 provides a system and method for transmitting data over communication bus 44 which compensates for discrepancies between the rate at which data is received at CPU 38, and the constant sixty-four Kbps data transmission rate of communication bus 44.

For example, in a particular embodiment, a receiver 37 coupled with CPU 38 receives data over communication link 36 at a rate of sixty-four Kbps. In this embodiment, the data transfer rate between network 35 and CPU 38 is equal to the data transfer rate of communication bus 44. Therefore, no correction is necessary to account for a discrepancy between data transfer rates. If, however, the data transfer rate between network 35 does not equal the data transfer rate of communication bus 44, steps must be taken to account for the discrepancy.

System 33 includes a repetition of data transmitted over communication bus 44 to account for this discrepancy. The number of repetitions is referred to as the repetition factor, and depends upon the discrepancy between data transfer rates. Assuming a constant data transfer rate of sixty-four Kbps over communication bus 44, one byte of data is transmitted over communication bus 44 multiple times in succeeding one hundred twenty-five microsecond frames. The repetition factor is equal to the data transfer rate of communication bus 44, divided by the data transfer rate between network 35 and CPU 38. As previously discussed, if the data transfer rates are equal, the repetition factor is equal to one, and no correction is necessary.

FIG. 3 illustrates a method for transmitting data over communication bus 44, an encoder 56 associated with telecommunications network 35 transmits pre-packed, digitized/compressed audio data to CPU 38. Encoder 56 is, for example, a G.726 encoder transmitting data at a rate of thirty-two Kbps. Therefore, the repetition factor is equal to two (64 Kbps÷32 Kbps=2).

Bits of data 58–73 are received at CPU 38, buffered and packed into four-bit frames 76–79. Each four-bit frame 76–79 is equivalent to a one hundred twenty-five microsecond sample. Accordingly, CPU 38 receives four bits of data every one hundred and twenty-five microsecond frame. CPU 38 then buffers and packs frames 76–79 into eight-bit bytes, or frames 82 and 84, prior to transmission over synchronous bus 44. Two hundred and fifty microseconds elapse while a single frame 82 is packed with data. Similarly, two hundred and fifty microseconds elapse while frame 84 is packed with data. However, communication bus 44 continuously "samples" data every one hundred twenty-five microseconds. In order to fill the void in time, each frame 82 and 84 is repeated two times, to correspond with the repetition factor of two, for transmission from a transmitter 39 coupled with CPU 38 to communications bus 44.

Communications bus 44 samples, or reads data from CPU 38 in eight-bit, one hundred and twenty-five microsecond frames 86–89. Each of frames 86 and 87 correspond to eight-bit byte 82, and each of frames 88 and 89 correspond with eight-bit byte 84. The repetition of eight-bit bytes 82 and 84 across communications bus 44 allows processor 40 to buffer multiple frames 86–89, and subsample, or decimate one out of every two samples, to correspond with the repetition factor.

Processor 40 receives two identical frames 86 and 87, and two identical frames 88 and 89. In order to rearrange the data into its original sequence, processor 40 subsamples one out of every two frames received. Therefore, a single frame 86 and a single frame 88 are sampled, packed into eight-bit bytes 92 and 94, and transmitted to a decoder 76 associated with processor 40. Eight-bit byte 92 corresponds with the data from frame 86 and eight-bit byte 94 corresponds with the data from frame 88.

Subsampling by processor 40 begins at the first location in the buffer, frame 86. However, subsampling need not begin at the first location of the buffer. For example, subsampling could have begun with frame 87, and continued along selecting one out of every two frames. In that case, frames 87 and 89 would have been transmitted to decoder 76. Accordingly, the original sequence of compressed samples is maintained regardless where subsampling begins.

Figure 4:
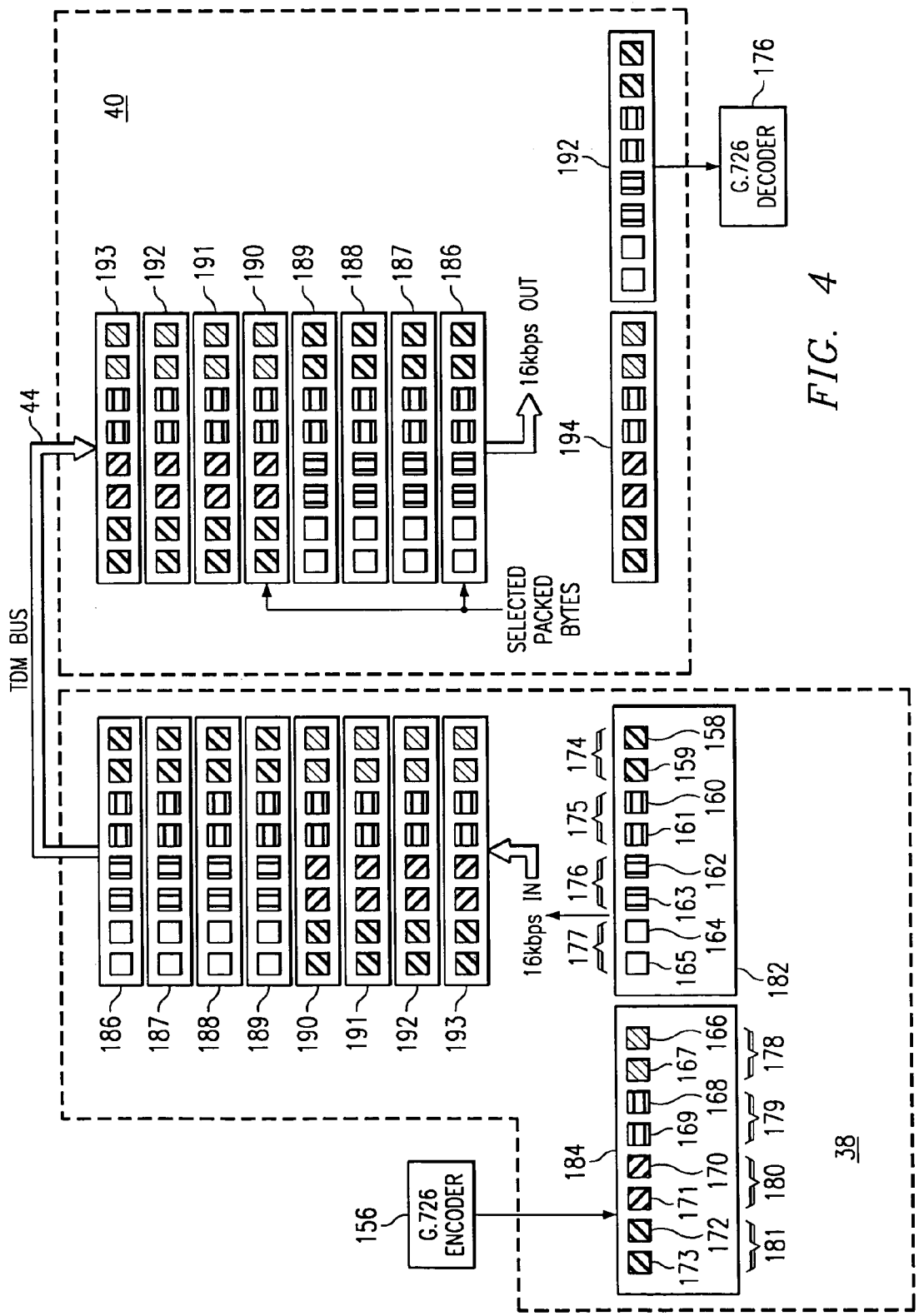
FIG. 4 is a block diagram illustrating a method for transmitting sixteen kilobit per second data through the communication system of FIG. 1, in accordance with a particular embodiment of the present invention.

FIG. 4 illustrates a method for transmitting data over communication bus 44, in accordance with another embodiment of the present invention. In FIG. 4, an encoder 156 associated with telecommunications network 35 (FIG. 1) transmits pre-packed, digitized/compressed audio data to CPU 38. Encoder 156 is a G.726 encoder transmitting data at a rate of sixteen Kbps. Therefore, the repetition factor is equal to four (64 Kbps÷16 Kbps= 4).

Bits of data 158–173 are received at CPU 38, buffered and packed into two-bit frames 174–181. Each two-bit frame 174–181 is equivalent to a one hundred twenty-five microsecond sample. Accordingly, CPU 38 receives two bits of data every one hundred twenty-five microsecond frame. CPU 38 then buffers and packs frames 174–181 into eight-bit bytes, or frames 182 and 184, prior to transmission over synchronous bus 44. Five hundred microseconds elapse while a single frame 182 is packed with data. Similarly, five hundred microseconds elapse while frame 184 is packed with data. However, communication bus 44 continuously "samples" data every one hundred twenty-five microseconds. In order to fill the void in time, each frame 182 and 184 is repeated four times, to correspond with the repetition factor of four, for transmission over communications bus 44.

Communication bus 44 samples, or reads data from CPU 38 in eight-bit, one hundred twenty-five microsecond frames 186–193. Each of frames 186–189 correspond to eight-bit byte 182, and each of frames 190–193 correspond with eight-bit byte 184. The repetition of eight-bit bytes 182 and 184 across communications bus 44 allows processor 40 to buffer multiple frames 186–193, and subsample, or decimate one out of every four samples, to correspond with the repetition factor of four.

Processor 40 receives four identical frames 186–189, and four identical frames 190–193. In order to rearrange the data into its original sequence, processor 40 subsamples one out of every four frames received. Therefore, a single frame 186 and a single frame 190 are sampled, packed into eight-bit bytes 192 and 194, and transmitted to a decoder 176 associated with processor 40. Eight-bit byte 192 corresponds with the data from frame 186 and eight-bit byte 194 corresponds with the data from frame 190.

Subsampling by processor 40 begins at the first location in the buffer, frame 186. However, subsampling need not begin at the first location of the buffer. For example, subsampling could have begun with frame 187, 188 or 189 and continued along selecting one out of every four frames. In that case, frames 187, 188, or 189 and one of frames 191, 192 or 193, respectively, would have been transmitted to decoder 176. Accordingly, the original sequence of compressed samples is maintained.

Data transmitted from and received by communication bus 44 is buffered at buffer manager/driver 45. In the illustrated embodiment of the present invention, manager/driver 45 builds one millisecond intermediate buffers of data for all read channels of communication bus 44. However, processors 40–42 are configured to receive ten millisecond buffers. Therefore buffering is accomplished on all data transmitted over communication bus 44.

Figure 5:
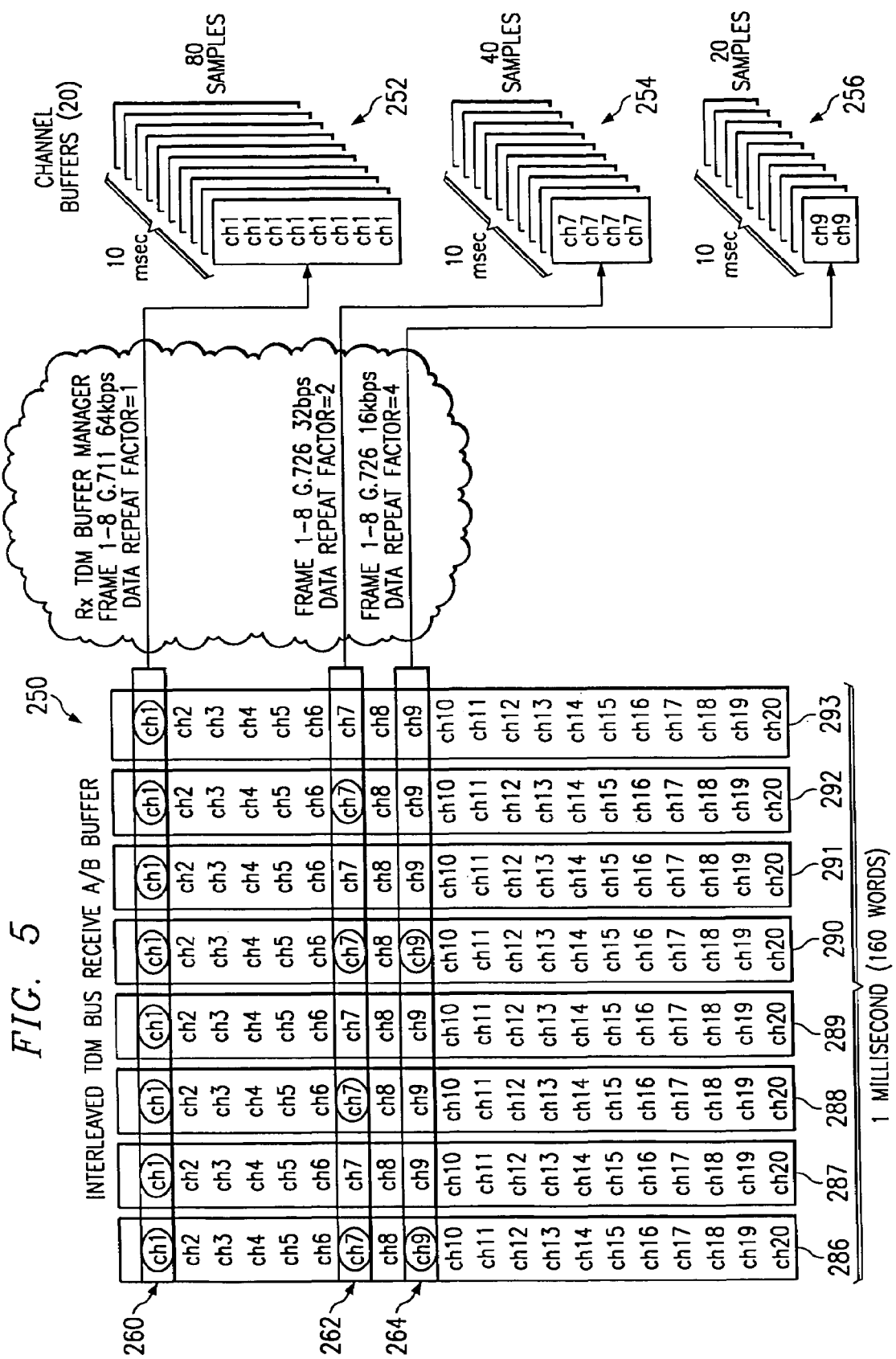
FIG. 5 is a block diagram illustrating a method for buffering data received by the communication system of FIG. 1, in accordance with a particular embodiment of the present invention.

FIG. 5 illustrates receive time slot buffering examples for twenty receive channels ch1–ch20. Each channel ch1–ch20 is read into a one millisecond intermediate buffer 250. Every millisecond, a direct memory access (DMA) interrupt occurs and eight frames 286–293 are read into buffer 250. Each frame 286–293 represents a 0.125 millisecond time slot. Therefore, one hundred and sixty words of data received from bus 44 become available at buffer manager/driver 45 every millisecond. Twenty channels of data ch1–ch20, eight frames each, are interleaved in buffer 250. Depending upon the data rate of each channel, buffer manager/driver 45 extracts data from buffer 250 and places the data into individual ten millisecond buffers 252, 254, or 256.

A horizontal bar 260 illustrates a receive buffering example with respect to the operation of a G.711 encoder operating at a data transfer rate of sixty-four kilobits per second. As previously discussed, data transmission over bus 44 at a data rate of sixty-four Kbps includes a repetition factor of one (64 Kbps÷64 Kbps=1) Therefore, buffer manager/driver 45 reads data from every frame 286–293. Eighty samples of data, representing eight samples every millisecond, for a total of ten milliseconds, are read into ten-millisecond buffer 252. Accordingly, data from one-millisecond buffer 250 is converted into ten-millisecond buffers 252.

Similarly, vertical bar 262 illustrates a receive buffering example with respect to the operation of a G.726 encoder operating at a data transfer rate of thirty-two Kbps. The repetition factor for such an encoder is equal to two (64 Kbps÷32 Kbps=2). Therefore, buffer manager/driver 45 reads every other frame 286–293 of data from one-millisecond buffer 250 to ten-millisecond buffer 254. For example, channel ch7 from each of frames 286, 288, 290 and 292 are read into buffer 254. Each channel ch7 enclosed in an oval within buffer 250 represents the start of a new sample. Subsequent samples, up to the next oval are repetitions, based upon the repetition factor. Ten-millisecond buffer 254 includes forty samples representing four samples every millisecond for a total of ten milliseconds.

Horizontal bar 264 represents the operation of a G.726 encoder operating at a data transfer rate of sixteen Kbps. The repetition factor for such an encoder is equal to four (64 Kbps÷16 Kbps=4). Therefore, buffer manager/driver 45 reads every fourth frame 286–293 of data from one-millisecond buffer 250 into ten-millisecond buffer 256. For example, channel ch9 is read from frames 286 and 290 of buffer 250 into buffer 256. Each channel ch9 enclosed in an oval within buffer 250 represents the start of a new sample. Subsequent samples, up to the next oval are repetitions, based upon the repetition factor. Ten-millisecond buffer 256 includes twenty samples, representing two samples every millisecond for a total of ten milliseconds.

In a particular embodiment of the present invention, buffer manager/driver 45 is "double buffered." Accordingly, two one-millisecond buffers operate simultaneously. While the first buffer is being received, the second buffer is available for processing.

Figure 6:
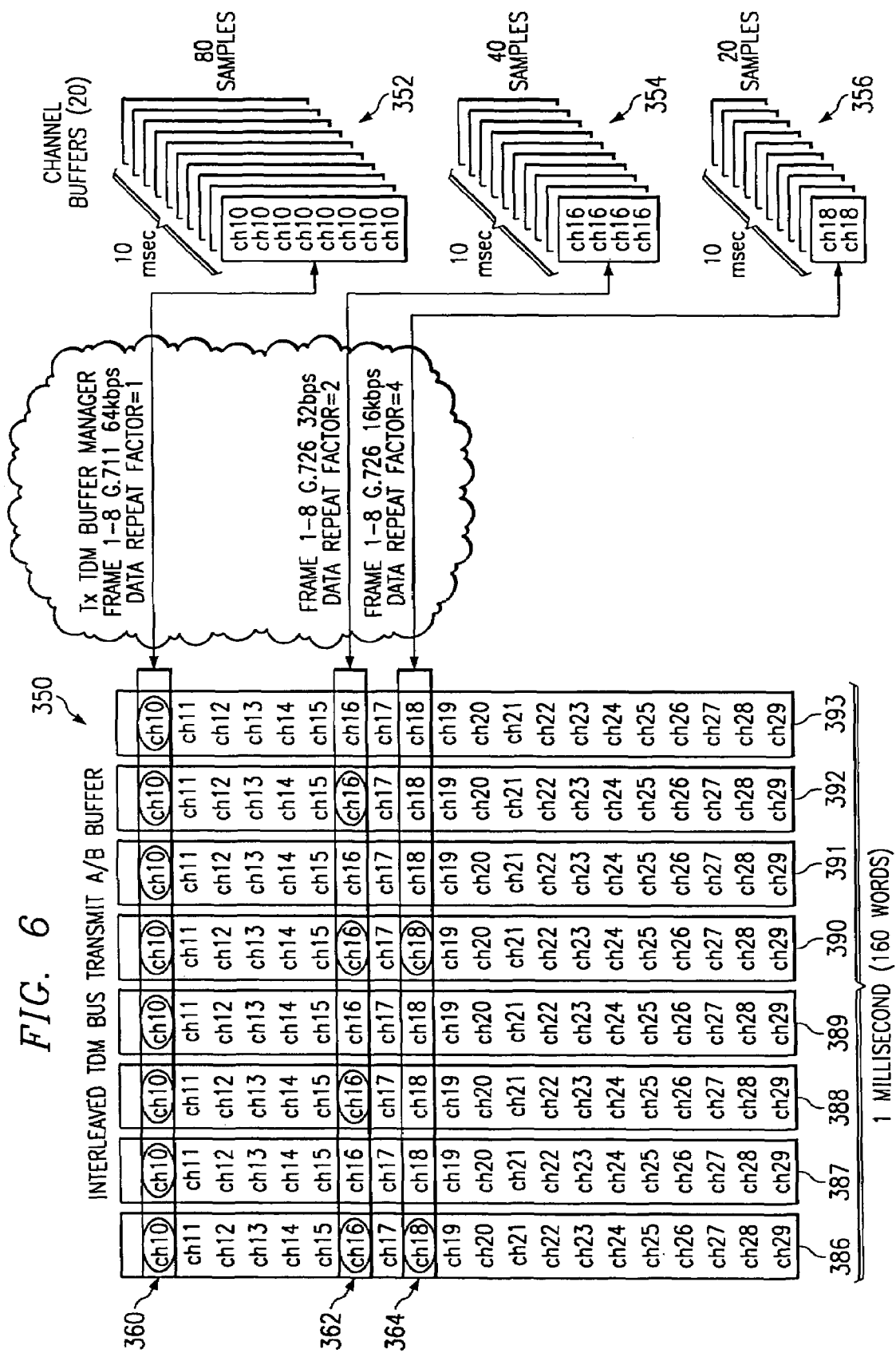
FIG. 6 is a block diagram illustrating a method for double buffering data received and/or transmitted by the communication system of FIG. 1, in accordance with a particular embodiment of the present invention.

FIG. 6 illustrates transmit time slot buffering examples for receive channels ch10–ch29. Each channel ch10–ch29 is read into a one millisecond intermediate buffer 350. Buffer 350 operates simultaneously with buffer 250 (FIG. 5). As buffer 250 is receiving data, buffer 350 is available for processing. Every millisecond, a DMA interrupt occurs and eight frames 386–393 are read into buffer 350. Each frame 386–393 represents a 0.125 millisecond time slot. Therefore, one hundred and sixty words of data are made available to bus 44, from buffer manager/driver 45, every millisecond. Twenty transmit channels of data ch10–ch29, eight frames each, are interleaved in buffer 350. Depending upon the data rate of each channel, buffer manager/driver 45 transmits data from ten-millisecond buffers 352, 354 and 356, and places the data into one-millisecond buffer 350.

Horizontal bar 360 illustrates a buffering example with respect to the operation of a G.711 encoder operating at a data transfer rate of sixty-four kilobits per second. As previously discussed, data transmission over bus 44 at a data rate of sixty-four Kbps includes a repetition factor of one (64 Kbps÷64 Kbps=1). Therefore, buffer manager/driver 45 transmits data to every frame 286–293. Eighty samples of data, representing eight samples every millisecond, for a total of ten milliseconds, are read into one-millisecond buffer 352. Accordingly, data from ten-millisecond buffer 352 is converted into one-millisecond buffer 350.

Similarly, horizontal bar 362 illustrates a transmit buffering example with respect to the operation of a G.726 encoder operating at a data transfer rate of thirty-two Kbps. The repetition factor for such an encoder is equal to two (64 Kbps÷32 Kbps=2). Therefore, buffer manager/driver 45 transmits data to every other frame 286–293 from ten-millisecond buffer 354 to one-millisecond buffer 350. Ten-millisecond buffer 354 includes forty samples representing four samples every millisecond. Buffer 354 transmits data to channel ch16 of each of frames 386, 388, 390 and 392 into buffer 350. Each channel ch16 enclosed in an oval within buffer 350 represents the start of a new sample. Subsequent samples, up to the next oval are repetitions, based upon the repetition rate.

Horizontal bar 364 represents the operation of a G.726 encoder operating at a data transfer rate of sixteen Kbps. The repetition factor for such an encoder is equal to four (64 Kbps÷16 Kbps=4). Therefore, buffer manager/driver 45 transmits data to every fourth frame 386–393 of data from ten-millisecond buffer 356, to one-millisecond buffer 350. Ten-millisecond buffer 356 includes twenty samples, representing two samples every millisecond for a total of ten milliseconds. Channel ch18 is read from buffer 356 to frames 386 and 390 of buffer 350. Each channel ch18 enclosed in an oval within buffer 350 represents the start of a new sample. Subsequent samples, up to the next oval are repetitions, based upon the repetition rate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for transmitting data, comprising:
   receiving data at a first data transfer rate;
   buffering the data into a plurality of sequential frames of a predetermined length of time;
   arranging the frames into a byte of data;
   transmitting the byte of data to a communication bus operable to receive data packets at a second data transfer rate;
   determining a repetition factor by dividing the second data transfer rate by the first data transfer rate; and
   repetitively transmitting the byte a number of times greater than one and equal to the repetition factor.

2. The method of claim 1, wherein:
   the first data transfer rate comprises approximately sixteen or thirty-two kilobits per second; and
   the second data transfer rate comprises sixty-four kilobits per second.

3. The method of claim 1, wherein the predetermined length of time comprises approximately one hundred twenty-five microseconds.

4. The method of claim 1, wherein the byte of data comprises an eight-bit byte of data.

5. The method of claim 1, wherein the number of times comprises two or four times.

6. The method of claim 1, further comprising:
   receiving the byte of data at a processor;
   buffering the byte of data into a plurality of samples; and
   retrieving one of a subset of the plurality of samples, wherein the subset of the plurality of samples includes a number of samples equal to the second data transfer rate divided by the first data transfer rate.

7. A system, comprising:
   a receiver operable to receive data packets at a first data transfer rate;
   a processor operable to buffer the data into a plurality of sequential frames of a predetermined length of time and to arrange the frames into a byte of data;
   the processor being further operable to determine a repetition factor by dividing a second data transfer rate by the first data transfer rate; and
   a transmitter operable to transmit the byte of data an integer number of times greater than one and equal to the repetition factor.

8. The system of claim 7, further comprising a signal processor operable to receive the byte of data, buffer the byte of data into a plurality of samples and retrieve one of a subset of the samples, the subset including a number of samples greater than one and equal to the second data transfer rate divided by the first data transfer rate.

9. The system of claim 7, wherein the first data transfer rate comprises approximately sixteen, or thirty-two kilobits per second.

10. The system of claim 7, wherein the frames comprise approximately one hundred twenty-five microsecond frames.

11. The system of claim 7, wherein the byte of data comprises an eight-bit byte of data.

12. The system of claim 7, wherein the second data transfer rate comprises approximately sixty-four kilobits per second.

13. The system of claim 7, wherein the integer number of times comprises two or four times.

14. A method, comprising:
    receiving a plurality of bytes of data at a first data transfer rate, from a device operable to receive data at a second data transfer rate and transmit the bytes of data at the first data transfer rate;
    determining a repetition factor by dividing the first data transfer rate by the second data transfer rate;
    buffering the bytes of data into a plurality of samples; and
    subsampling one of a subset of the plurality of samples, wherein the subset of the plurality of samples includes a number of samples greater than one and equal to the repetition factor.

15. The method of claim 14, wherein the first data transfer rate comprises approximately sixty-four kilobits per second.

16. The method of claim 14, wherein the second data transfer rate comprises sixteen or thirty-two kilobits per second.

17. The method of claim 14, wherein the number of samples comprises two or four samples.

18. A system, comprising:
    a receiver operable to receive bytes of data at a first data transfer rate; and
    a processor operable to determine a repetition factor by dividing the first data transfer rate by a second data transfer rate, buffer the bytes of data into a plurality of samples and subsample one of a subset of the plurality of samples, wherein the subset of the plurality of samples includes an integer number of samples greater than one and equal to repetition factor.

19. The system of claim 18, wherein the central processing unit comprises a digital signal processor.

20. The system of claim 18, wherein the first data transfer rate comprises approximately sixty-four kilobits per second.

21. The system of claim 18, wherein the number of samples comprises two or four samples.

22. A system for processing transactions, comprising:
    a computer-readable medium; and
    a computer program encoded on the computer-readable medium, the computer program operable to receive data at a first data transfer rate, buffer the data into a plurality of sequential frames of a predetermined length of time, pack the frames into a byte of data, transmit the byte of data to a communication bus operable to receive data at a second data transfer rate, determine a repetition factor by dividing the second data transfer rate by the first data transfer rate, and wherein the byte is repetitively transmitted an integer number of times greater than one and equal to the repetition factor.

23. A system for processing transactions, comprising:
    a computer-readable medium; and
    a computer program encoded on the computer-readable medium, the computer program operable to receive a plurality of bytes of data at a first data transfer rate, from a device operable to receive data at a second data transfer rate and transmit the bytes of data at the first data transfer rate, buffer the bytes of data into a plurality of samples, determine a repetition factor by dividing the first data transfer rate by the second data transfer rate, and subsample one of a subset of the plurality of samples, wherein the subset of the plurality of samples includes a number of samples greater than one and equal to the repetition factor.

* * * * *